(12) United States Patent
Seidman et al.

(10) Patent No.: US 6,298,482 B1
(45) Date of Patent: Oct. 2, 2001

(54) SYSTEM FOR TWO-WAY DIGITAL MULTIMEDIA BROADCAST AND INTERACTIVE SERVICES

(75) Inventors: David Israel Seidman, New York; Frank Andre Schaffa, Hartsdale, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/968,404

(22) Filed: Nov. 12, 1997

(51) Int. Cl.$^7$ .......................... H04N 5/445; H04N 7/173
(52) U.S. Cl. .............. 725/101; 725/40; 725/46; 725/100; 725/118
(58) Field of Search .................. 348/1, 3, 4, 7, 348/9, 12, 13; 455/5.1, 473; 709/200, 206; 705/1, 14, 27; 707/104, 540, 911, 573, 505; 725/39, 40, 46, 91, 98, 110, 112, 118, 101

(56) References Cited

U.S. PATENT DOCUMENTS

| | | | |
|---|---|---|---|
| 5,550,578 | * 8/1996 | Hoarty et al. | 348/7 |
| 5,596,705 | * 1/1997 | Reimer et al. | 395/326 |
| 5,600,364 | * 2/1997 | Hendricks et al. | 348/1 |
| 5,614,940 | * 3/1997 | Cobbley et al. | 348/7 |
| 5,640,192 | * 6/1997 | Garfinkle | 348/1 |
| 5,652,615 | * 7/1997 | Bryan et al. | 348/9 |
| 5,720,037 | * 2/1998 | Billiris et al. | 395/200.09 |
| 5,754,773 | * 5/1998 | Ozden et al. | 395/200.33 |
| 5,774,666 | * 6/1998 | Portuesi | 395/200.48 |
| 5,861,881 | * 1/1999 | Freeman et al. | 345/302 |
| 5,894,320 | * 4/1999 | Vanceltte | 348/7 |
| 5,900,905 | * 5/1999 | Shoff et al. | 348/12 |
| 5,929,850 | * 7/1999 | Broadwin et al. | 345/327 |
| 5,931,908 | * 8/1999 | Gerba et al. | 709/219 |

* cited by examiner

*Primary Examiner*—Andrew Faile
*Assistant Examiner*—Kieu-Oanh Bui
(74) *Attorney, Agent, or Firm*—Scully, Scott, Murphy & Presser; Douglas W. Cameron, Esq.

(57) ABSTRACT

A system is presented for two-way digital multimedia broadcast services, enabling a variety of interactive and other applications. These applications include: navigation from one video program to another by selection of objects in the current video; creation and transmission of records of user viewing selection histories; iterative video-based data search and retrieval; dynamic customization of coordination between video content of the broadcast stream and data embedded therein; and the dynamic creation of "personalized" programs by the user without, through the broadcast and selection of overlapping program segments which are themselves customized for a particular user or group of users.

3 Claims, 9 Drawing Sheets

| | |
|---|---|
| 51 | PROFILE NAME |
| 52 | VIEWER NAME |
| 53 | VIEWER MAIL ADDRESS |
| 54 | VIEWER E-MAIL ADDRESS |
| 55 | VIEWER TELEPHONE NUMBER |
| 56 | VIEWER FAX NUMBER |
| 57 | VIEWER AGE |
| 58 | VIEWER SEX |
| 59 | HISTORICAL REPORT PERIOD |
| 60 | HISTORICAL REPORT TYPE |
| 61 | VIEWING PREFERENCES |
| 62 | RATING INFORMATION |
| 63 | INSTANT FEEDBACK ENABLE/DISABLE |
| 64 | PERSONAL INFORMATION ENABLE/DISABLE |
| 82 | MESSAGE FILTERING INFORMATION |

FIG.5

| 65 | PROFILE NAME |
| --- | --- |
| 66 | START DATE |
| 67 | END DATE |
| 68 | AVERAGE NUMBER OF HOURS VIEWED PER DAY |
| 69 | MINIMUM NUMBER OF HOURS VIEWED PER DAY |
| 70 | MAXIMUM NUMBER OF HOURS VIEWED PER DAY |
| 71 | NUMBER OF HYPERLINKS SELECTED |
| 72 | NUMBER OF INTERACTIVE APPLICATIONS SELECTED |
| 73 | NUMBER OF PROGRAMS VIEWED |
| 74 | NUMBER OF COMMERCIALS VIEWED |
| 75 | VIEWING PREFERENCES OVER SUMMARY PERIOD |

FIG.6

| | |
|---|---|
| 76 | PROFILE NAME |
| 77 | START DATE |
| 78 | END DATE |
| 79 | NUMBER OF SELECTION HISTORY RECORDS INCLUDED |
| 80 | SELECTION HISTORY RECORD 1 |
| | • |
| | • |
| | SELECTION HISTORY RECORD n |

SYSTEM FOR TWO-WAY DIGITAL MULTIMEDIA BROADCAST AND INTERACTIVE SERVICES

DESCRIPTION

1. Technical Field

This invention relates to a method of delivering data from a server to a plurality of subscribers connected to the server.

2. Description of the Prior Art

ITV systems require a network architecture which supplies an "upstream" (from user to head end) and a "downstream" (from head end to user) channel to each user. Most commonly, the downstream channel has been the TV broadcast, satellite, or cable medium, while the upstream channel has used the public service telephone network. Typical ITV applications have included viewer polling, home shopping, and distance learning. These applications were frequently menu-based, and static—i.e. a modest number of choices in a given category were pre-programmed into the system and offered to users.

In U.S. Pat. No. 4,536,791, a method is presented for "channel monitoring"—i.e. the transmission to the head end of information regarding current viewing information, such as when a set is turned on, what channel it is tuned to, and when the channel is changed. This patent also presents an "interactive information retrieval" capability, with which the viewer may access a data bank by interacting with the head end by use of a non-video TV channel (uses keyboard or keyboard-like remote.) U.S. Pat. No. 4,924,303 describes a system which allows users to search for and retrieve still frame video images and audio segments. U.S. Pat. No. 5,355,480 describes an interactive TV terminal for user with services such as in-room hotel checkout. A distance learning ITV system is described in U.S. Pat. No. 5,537,141. This system supplies prepared pre-recorded audio responses which are customized for individual students' responses to questions.

U.S. Pat. No. 5,550,578 describes an ITV system for the delivery of video and data, the latter from a variety of information services.

The A. C. Nielsen company (Nielsen Media Research Interactive Services Co.) utilizes special-purpose hardware (the "Storage Instantaneous Audimeter" and "Nielsen People Meter") for the purpose of monitoring TV viewing behavior. These devices monitor home viewing per household member, and report to a central location by use of telephone lines. Because of the complications involved in distributing this hardware, only a limited number of these units are in use (5000 units, as of July 1997, distributed to "Nielsen families"). The system presented here requires no special purpose hardware, allowing a larger number of viewers to be included in the sample. Previous monitoring systems were limited to the use of the phone line in both the head-end-to-user direction and vice versa, causing complications if another device (e.g. a fax machine) answered the phone, receiving the message from the head end. The system presented here gives a dedicated channel to the head end for control of the STB, namely the private data channel in the digital broadcast stream, as described below. In addition, the system presented here allows a finer granularity of viewer selection report to the head-end (i.e. a single program selection or termination) and a shorter reporting period (an immediate report following the selection—i.e. "instant feedback" as described below—as opposed to a daily viewing report.)

Patent applications, Ser. Nos. 08/854,227 and 08/854,225, assigned to the same assignee as that of the instant application, describe systems, which customize the program material which is sent to the user. For example, the (video) commercials seen by the viewer of a video program are customized based on the viewer's interests.

The above mentioned systems customize content without the user's participation, on the basis of historical profiles, not allowing user "navigation" through databases, as described below.

There is, therefore, a need for a dynamic system for the interactive delivery of data. By "dynamic", we mean rapidly adaptive. More specifically there is a need for a system which:

1. enables the user to navigate through a vast collection of resources, such as a multimedia database (as opposed to a small number of pre-defined selections);
2. enables this navigation to be performed within the medium itself, e.g. navigation (switching to another video program) through a group of videos by interaction with the objects in videos themselves, as opposed to navigation by use of another medium, e.g. searching through supplementary information such as a text list of video titles and keywords;
3. delivers multimedia resources to the user on the basis of selection and search activity performed by the user and the head end in tandem.
4. spontaneously modifies both the content of the digital stream (e.g. video and data files) as well as the association of objects in the stream (e.g. the association of objects appearing in the video to text files on related topics.)

BRIEF DESCRIPTION OF THE DRAWINGS

FIGS. 4 through 7 show the format of various data structures which are used in implementing the VRS.

SUMMARY OF THE INVENTION

The invention is a viewer response system (VRS) for the two-way digital multimedia broadcast environment. It enables many of the applications associated with interactive television (ITV), plus many new applications (described below) which are not enabled with existing ITV systems.

It is an object of this invention to provide a system which performs statistic gathering on viewer selections in a manner which is unobtrusive to the user and which is automatic and instantaneous, at the discretion of the user.

It is another object of this invention to provide a system in which VRS-capable STB's can be mixed with other STB's with no adverse effects on each other, or complications for the system.

It is another object of this invention to provide a system in which VRS-capable STB's can be used in networks without VRS capabilities, and perform conventional STB functions.

In the present invention, the head end broadcasts a multiplexed stream to viewers connected to a shared medium. This stream contains video and audio content as well as control information and embedded data (see Description of the Preferred Embodiment.)

The new applications enabled by VRS include:

Intra-Video Navigation—i.e. the ability for the viewer to move from one video (and audio) program to another without exiting the video display interface;

Viewer Response Monitoring—Keeps track of viewer selection information and periodically reports it to the head end, if enabled;

Iterative Video-Based Data Search and Retrieval—Allows the viewer of a program to select and modify the data which is embedded in a program program dynamically, while viewing, in order to search and retrieve items from a multimedia database;

Dynamic Customization of Embedded Data—Spontaneously adapts to viewers' current interests by modifying data files embedded in the stream and their correspondence with video objects;

Personalized Program Creation—By broadcasting overlapping video (and audio) program segments, enables the creation, by the viewer (or automatically by the viewers' STB) of a display program suited to the viewers' interests.

Accordingly, this invention is a method of customizing video programs received by each subscriber by a group of subscribers. With this invention a set of program segments of the program are transmitted from the head end to the group of subscribers, where the set is selected by the head end server in accordance with profile information on group of subscribers. Then each of the subscribers selects a respective ordered subset of the set of program segments. In one specific aspect of this invention subset can be ordered by the subscriber without sending any data to the head end server.

In another aspect of this invention, a method of navigating through a video database is provided. With this method a first video program is transmitted from the head end to the subscriber. An object in the first video program can be selected, where the object is an image in the first video program and where the object is not part of any supplementary information added to the first video program. This selection information is then transmitted to the head end. In response to the received selection information the head end then transmits a second video program to the subscriber, where the second video program corresponds to the object selected in the first video program.

In yet another aspect of this invention a method of acquiring subscriber selection history information on a number of subscribers is provided. With this method selected video programs are transmitted from the head end to the subscribers in response to requests for the selected video programs from the subscribers. Each of the subscribers selects objects in a received video programs, where each object is an image in one of video programs, is not a part of any embedded data added to the programs, and corresponds to a file containing information on a subject which corresponds to the appearance of each respective object. Finally, a selection database history of the object selections is maintained. This selection database history can then be used to dynamically adjust the correspondence of the objects to the files, where each subscriber receives customized information in response to selecting an object.

DESCRIPTION OF THE PREFERRED EMBODIMENT

The present invention assumes the availability of two communication paths between the head end and the viewer (or user.) The path from the head end to the viewer (known as the "downstream" path or channel) is, of necessity, of higher bandwidth than the path from the viewer to the head end (the "upstream" path or channel.) The downstream path is used to deliver the video, audio, data, and other multimedia content to the viewer, as well as control information. The upstream path is used to deliver viewer requests and selections to the head end.

The digital stream which is transmitted on the downstream path is a multiplex of streams of various media, such as video and audio, and may contain multiple streams of each media type. An example is a video program with several associated audio streams for different languages. The media streams may be coordinated, such as the video and each audio stream in this example, or uncoordinated, such as the disparate audio streams. The media streams may or may not overlap in time.

The present invention requires the use, at the viewers' premises, of a set-top box (STB). The STB receives the incoming downstream signal, tunes to the desired channel, demultiplexes and decodes the desired media stream(s), filters out unwanted information, and controls the interface to the head end via the upstream channel. The STB may or may not have storage capabilities. It is described below in more detail.

Figure 8A:
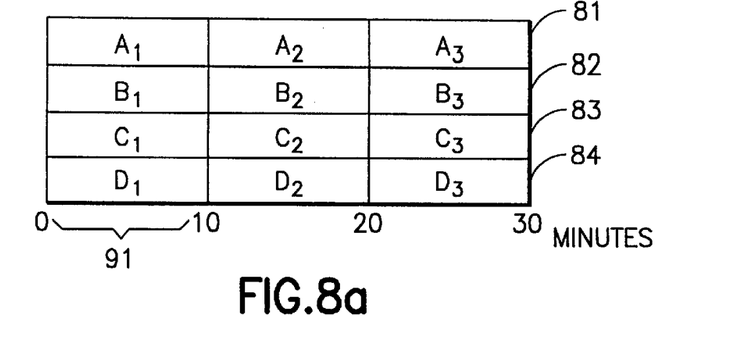
FIG. 8 shows how the overlapping program segments in the stream are scheduled, in a synchronous (FIG. 8a), semi-synchronous (FIG. 8b), or asynchronous (FIG. 8c) manner. The horizontal axis indicates time, while the vertical axis indicates three or four media streams (see Summary for definition), labeled A, B, C, and D.
Figure 8B:
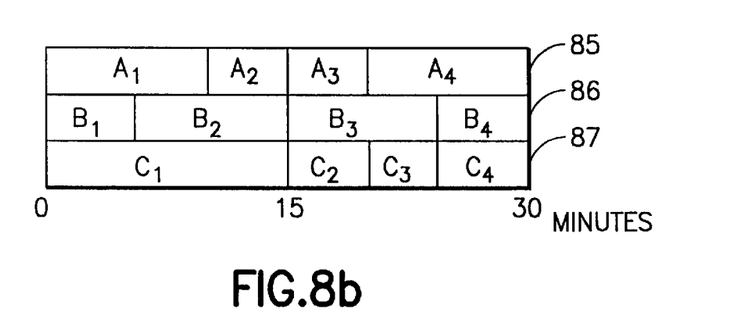
Figure 8C:
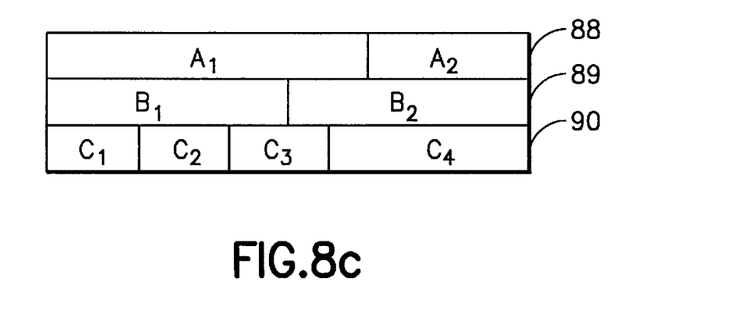
Figure 9:
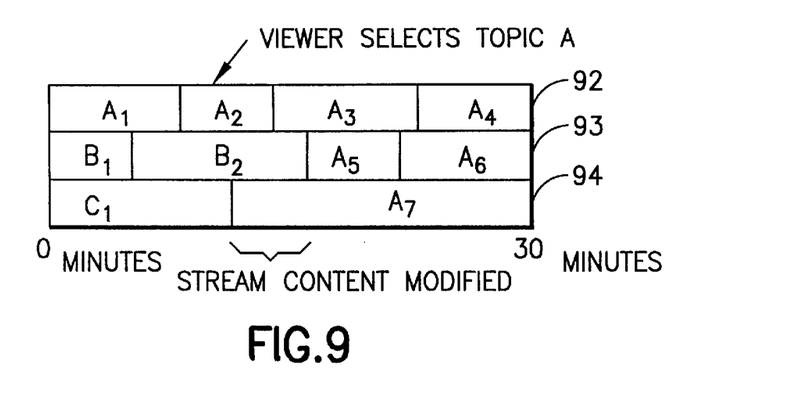
FIG. 9 shows an example of how the content of the digital stream can be modified at the direction of the user or group of users. Originally, three overlapping media streams, A, B, and C are transmitted. When the user (or group) indicates interest in the topic depicted in segment $A_2$, the video (or audio or data) content of the stream is modified at the head end, and all subsequent program segments are related to this topic.

The following terms are used in the discussion that follows:

A media stream is a digital bitstream of a specific medium, such as a video bitstream for a one-hour movie. FIGS. 8a–8c shows media streams 81–90 and FIG. 9 shows media streams 92–94.

A program segment is a section of a media stream, whose duration is shorter than or equal to the duration of the media stream. An example is a five-minute video program segment in a ten-minute video media stream. Program segments are generally self-contained. FIG. 8a shows program segment $D_1$ 91 as well as $A_1-A_3$, $B_1-B_3$, $C_1-C_3$, and $D_2$ and $D_3$.

A multiplex is a set of media streams which are coordinated for concurrent play, such as a video media stream and an audio media stream.

The term program (as used here) refers to the continuous presentation of material selected for viewing (and listening) by the viewer. An example is a news program, consisting of the continuous presentation of audio and video material as selected by the viewer. Embedded data can also be included in a program.

Objects are well-defined sub-units discernible in a media stream, such as visible objects ("video objects") in a video stream, words ("audio objects") in an audio stream, or files ("data objects") in a data stream. In the following discussion, "data" is used to refer to various types of information, such as text files, computer programs, pointers to various media types, messages to be displayed on-screen, and control information. "Embedded data" can include all of the above types of information, as well as multimedia information such as video and audio content.

Intra-Video Navigation

The present invention enables the provision, to the user, of the capability to navigate through a large number of video (and other multimedia) resources in a unique fashion. The user can move within and between video sources without exiting the viewing of the video display. By selecting video objects (see above) within the current video, the viewer is given the ability to move to one or more alternative video sources. From that video, the same capability can move the user to another video source, and so on.

This capability is enabled by preparing the source video by marking the location of significant video objects in the video content. The same "marking" can be done for audio objects. In the marking process, the objects are uniquely identified and flagged so that the user, in playing the source, will be aware of the presence of a marked object. The marking also identifies other video, audio, or data objects in the stream which are related to the marked object, and, or pointers to related objects which are not currently in the stream. An example of a marked object is the image of a person which appears in a set of video frames.

In selecting a marked object (using a user interface such as that which is described in the preferred embodiment) the user is presented with the alternative media choices associated with the selected object. The association of video (or audio) object and alternative media choices is flexible and dynamic, as described in "Customization of Embedded Data" below. The alternative may be a video source, audio source, data file, etc. In the context of intra-video navigation, it is an alternative video source.

Once the user has selected from among the alternatives which are displayed, the STB relays this selection to the head end, in addition to storing the selection information in the user's selection history (see "Viewer Response Monitoring"). In response to the selection, the head end modifies the video (and/or audio) stream within the multiplex which is sent on the downstream path. It does so by switching from the current video (and/or audio) media stream to a new media stream, as indicated by the viewer's selection.

The above discussion assumes that the user has a dedicated video program to himself. If this is not the case, similar navigation can be done on the basis of the consensus of groups of users, whose selections are used to poll user interest in moving to another program.

Viewer Response Monitoring

VRS enables a variety of functions intended for keeping track of a user's viewing history. This historical information is used, both at the head end and at the STB, for customization of content which is delivered to the user. In addition, this information is used by the head end to monitor the popularity of programs and advertisements, and to assemble demographic information on viewers.

Figure 1:
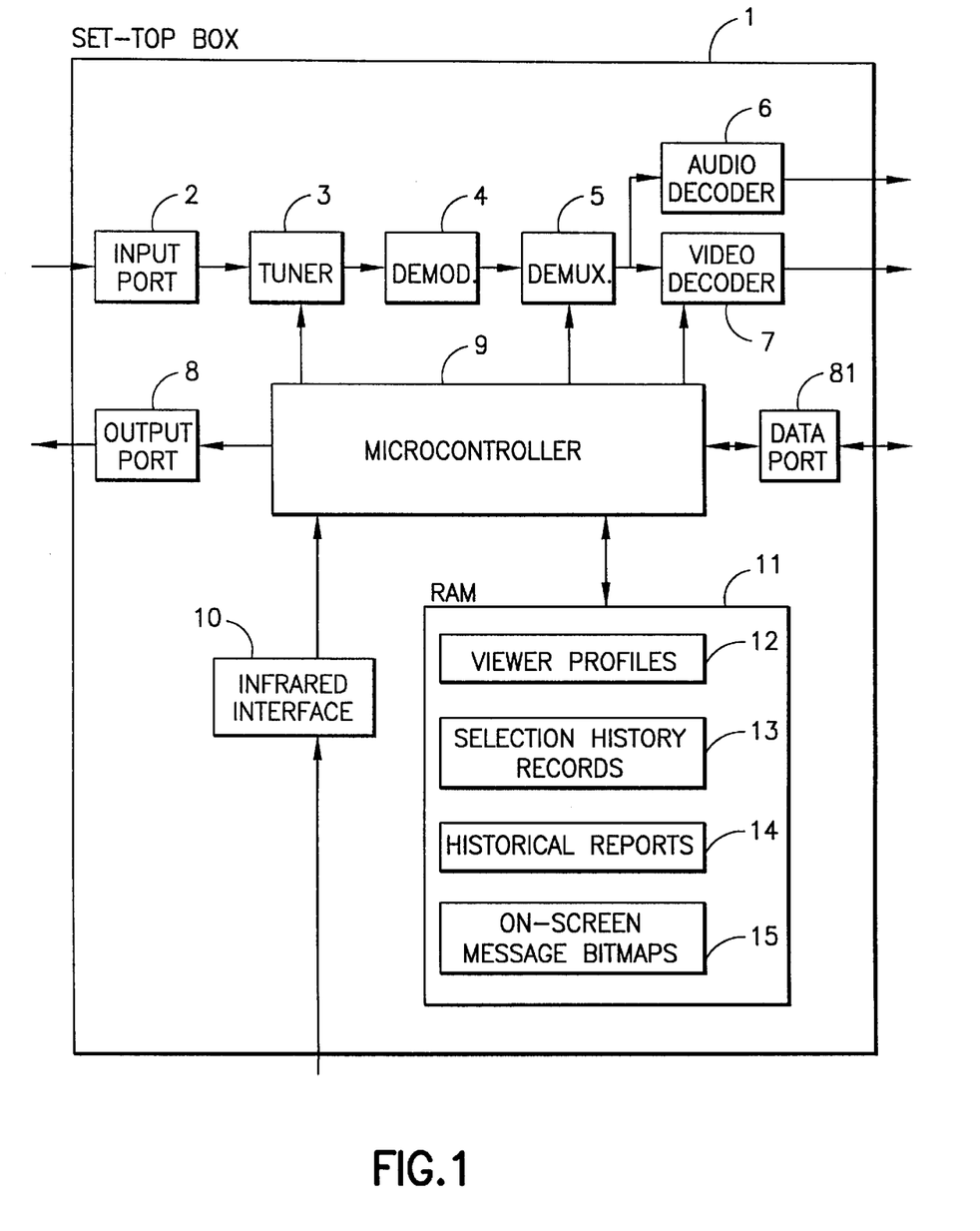
FIG. 1 depicts the elements required in a set-top box (STB) which is capable of implementing the VRS.
Figures 2, 2A:
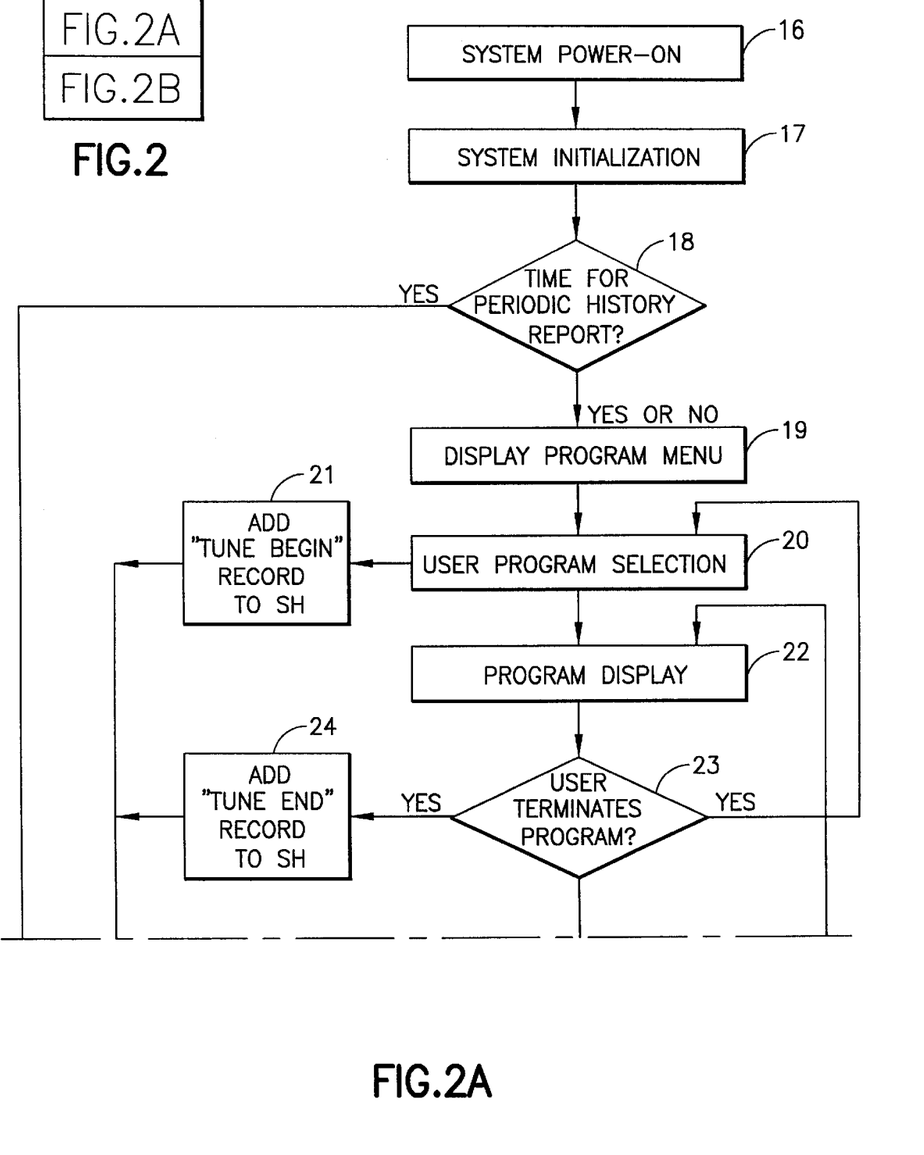
FIG. 2 is a flowchart showing the basic operation of VRS in the context of regular (video) program viewing. Also shown are the operation of VRS when multimedia data is embedded in the program, in which case information availability messages are filtered by the user's viewer profile.
Figure 2B:
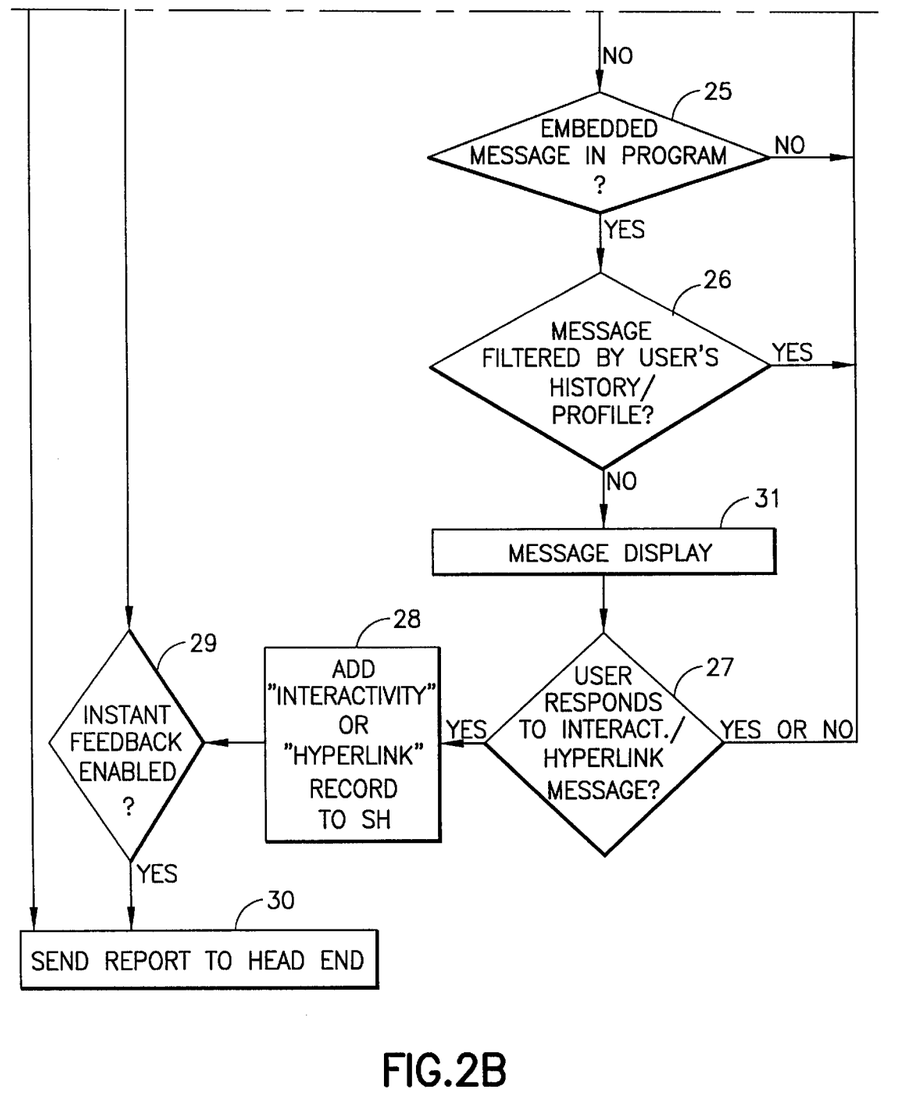

VRS enables these functions (see FIG. 1) by use of a microcontroller 9 and RAM 11 in the user's STB 1. This STB contains the typical elements for the reception, processing, and decoding of digital multimedia broadcasts. The incoming stream, sent from the head end over a network, arrives via an input port 2, and a tuner 3 selects the desired channel. A demodulator 4 extracts the digital stream from its analog, modulated format. A demultiplexer 5 filters out the selected program in the digital stream, which is then decoded by video 6 and audio 7 decoders. An infrared interface 10 decoder receives selection commands from the user for channel tuning, interactivity, and hyperlink commands (see below.) In order to reduce the amount of RAM required in the VRS STB, an optional data port 81 may be included. Using this serial or parallel port, users can connect the STB to a personal computer (PC) for storage and retrieval of large files.

Figure 6:
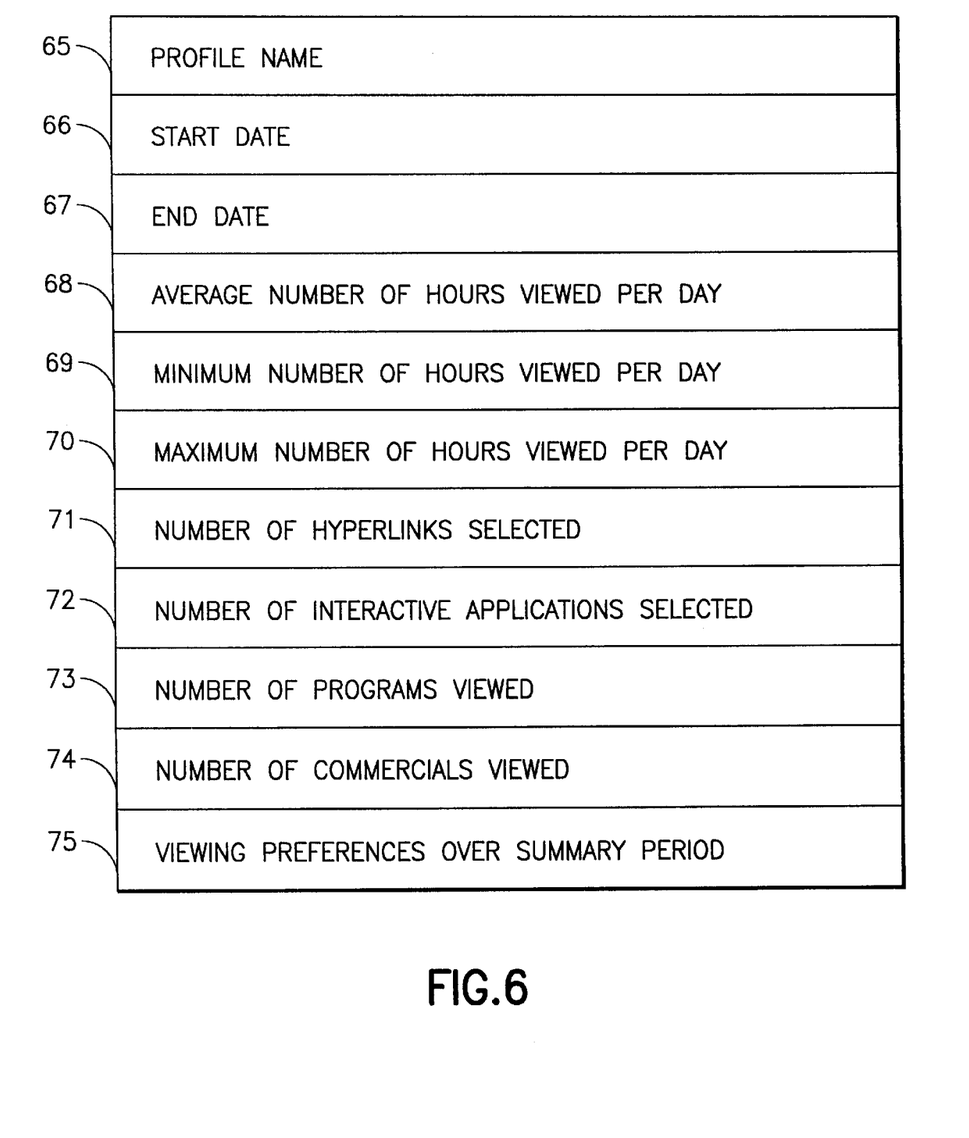
FIG. 6 shows the format for the "summary" type of the VRS historical report.

When VRS is installed on the user's premises equipment (and optionally when other viewers wish to use the system), a viewer profile 12 is created for the user and stored in the STB RAM. The format for this profile is shown in FIG. 6 and will be discussed below. The profile is created by use of an on-screen menu display, similar to those used for adjusting picture controls, using the infrared remote control unit. Since a STB may be shared among several users (such as family members), each STB can support a large number of profiles, and a profile is selected during the initialization process. There may be multiple profiles per user, if so desired.

Each time the user's system is powered on, 16, after system initialization 17 (which includes identification of the viewer profile to be used for this viewing session), the microcontroller determines if a periodic historical report is due 18, based on the "historical report period" parameter 59 in the viewer profile and the current time and date. This parameter is adjustable by the user. If a report is due, it is sent to the head end via the STB output port 8. The report may be a summary of viewing activity over the report period, or a more detailed description of viewing behavior, based on the "historical report type" parameter 60 in the viewer profile. The "personal information enable,idisable" parameter 64 in the viewer profile information allows the user to control the amount of his personal information which is included in the historical report.

VRS historical reports containing subscriber selection history information can be used by the head end to monitor the popularity of programs and commercial messages. In addition (assuming a short report period such as a few hours), the VRS reports may be used by the head end to determine the status of the user's equipment and to diagnose problems. Reports to the head end can also be prompted by the head end by use of a "send report" message sent by the head end in the "private data" area of a video stream or in a non-video control stream. The collection by the head end of historical reports can also be done at times when the user is not viewing programs, such as during late night hours, provided the STB is powered on.

Figure 4:
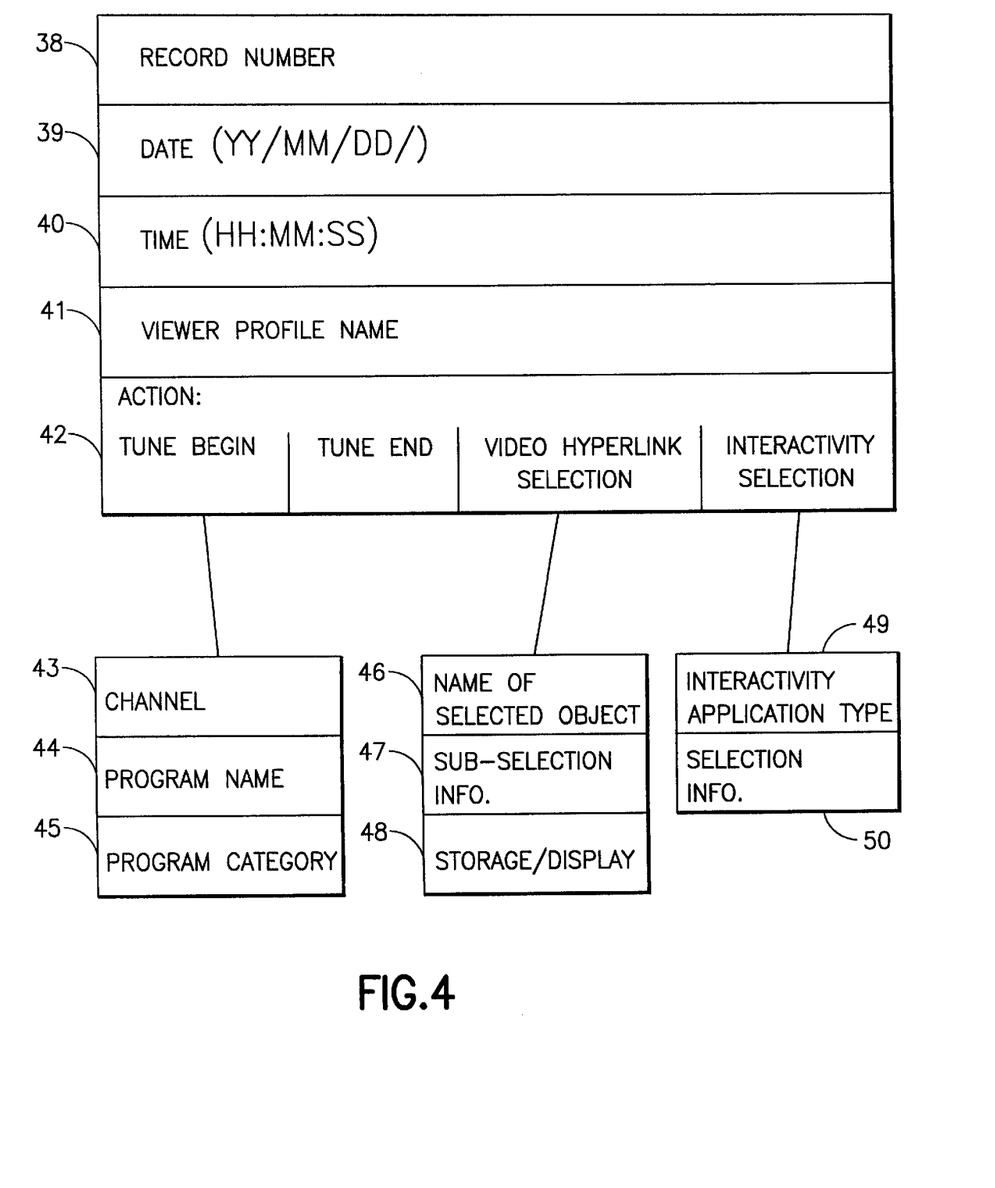
FIG. 4 shows the format for the selection history record.

The program menu 19 is displayed to the user to notify him of the viewing options which are available. The user selects a program for viewing 20 which then beings display 22. At the same time, an entry is added to the "selection history" (SH) 13 in the STB RAM to record this program selection. The entry indicates "tune beginer" i.e. the user has tuned to a program. The format for the selection history record (SHR) is shown in FIG. 4 and will be discussed below. If the "instant feedback enable disable" parameter in the viewer profile 63 is set to "enable", a message indicating this program choice is sent to the head end via the STB output port. Since the head end collects more data from those users who have enabled instant feedback, incentives may be offered to these viewers to encourage them to enable this function, and to enable the transmission of personal information from the viewer profile. Thus, the granularity of the message sent to the head end is a single viewer selection. VRS thus allows the head end to gather statistics on viewing selections by the user without requiring any effort from the user, and without allowing tampering of this information by the user. It is also unobtrusive to the viewing process.

Viewing of the program continues until the viewer terminates the viewing by ending the viewing session (i.e. turning off the system) or tuning to a different program. In either case, a "tune end" SHR 24 is added to the SH and sent to the head end, if instant feedback is enabled.

If the program being viewed has embedded data 25 the microcontroller, on the basis of the "message filtering data" 82 in the viewer profile will determine if the message announcing the availability of the embedded data should be shown to the user 26. If so, it is displayed on screen 31, using the on-screen message bitmaps 15 which are stored in the STB RAM. Alternatively, the message can consist of an audio tone or "pre-recorded" audio phrase, e.g. "embedded data is now available".

If the user responds to the availability message (or to information in the program regarding interactivity options such as shopping or polling), a "hyperlink" or "interactivity" record is added to the SH and sent to the head end, if instant feedback is enabled.

The selection history records (see FIG. 4) are used both by the user's system and the head end as records of individual viewing decisions by the user. They are used in the creation of "summary"-type VRS historical reports (see FIG. 6) and "detailed"-type reports (see FIG. 7). A SHR for a "tune begin" event records, in addition to the profile name, date and time, the channel tuned to, the program name, and the program category (e.g. news, drama, etc.) A SHR for a "tune end" event records only the profile name, time, and date. For video hyperlink selection, the SHR records the name of the object selected, sub-selection information (e.g. when selecting a person in a video, the user may choose between a short biography, long biography, or video clip relating to this person), and whether the user stored the related information or displayed it immediately. For an interactivity selection, the SHR records the type of interactivity application (e.g. home shopping) and the selection information.

Figure 7:
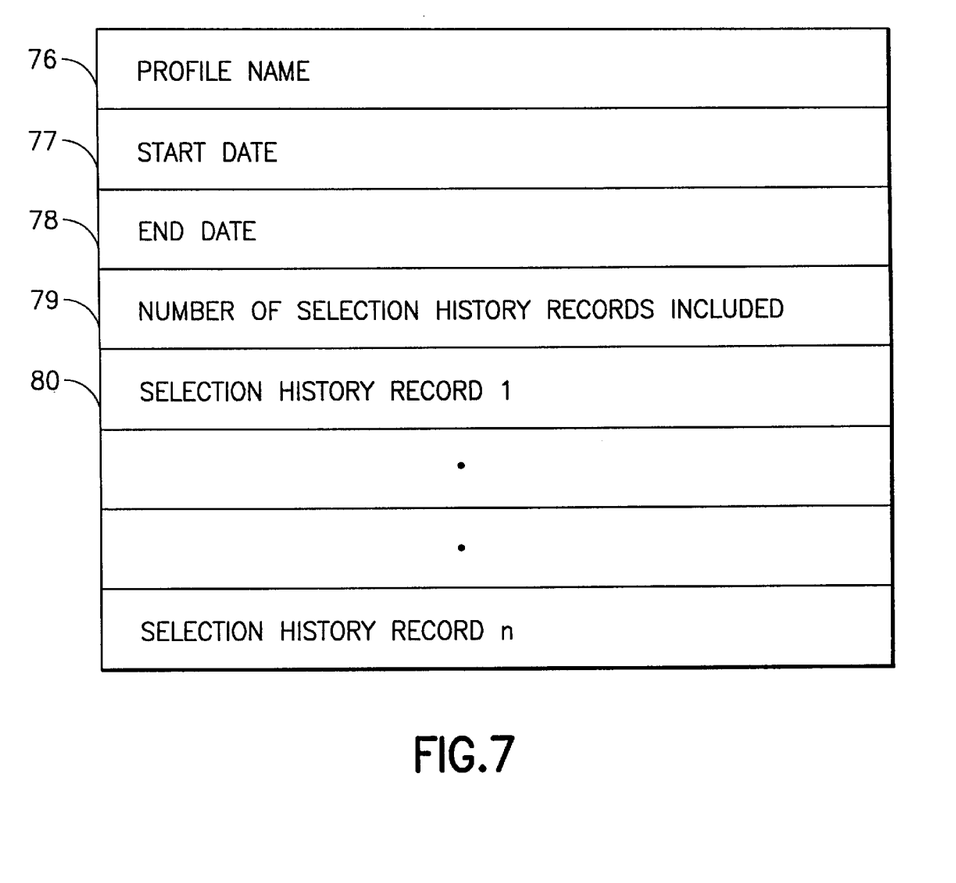
FIG. 7 shows the format for the "detailed" type of the VRS historical report.

Detailed VRS historical reports contain a number n of SHR's 80 in addition to the basic profile information and report start and end dates. Summary-type VRS historical reports summarize the viewing behavior of the user with this profile over the report period, including number of programs viewed 73, average number of hours viewed per day 68, and viewing preferences 75.

Figure 5:
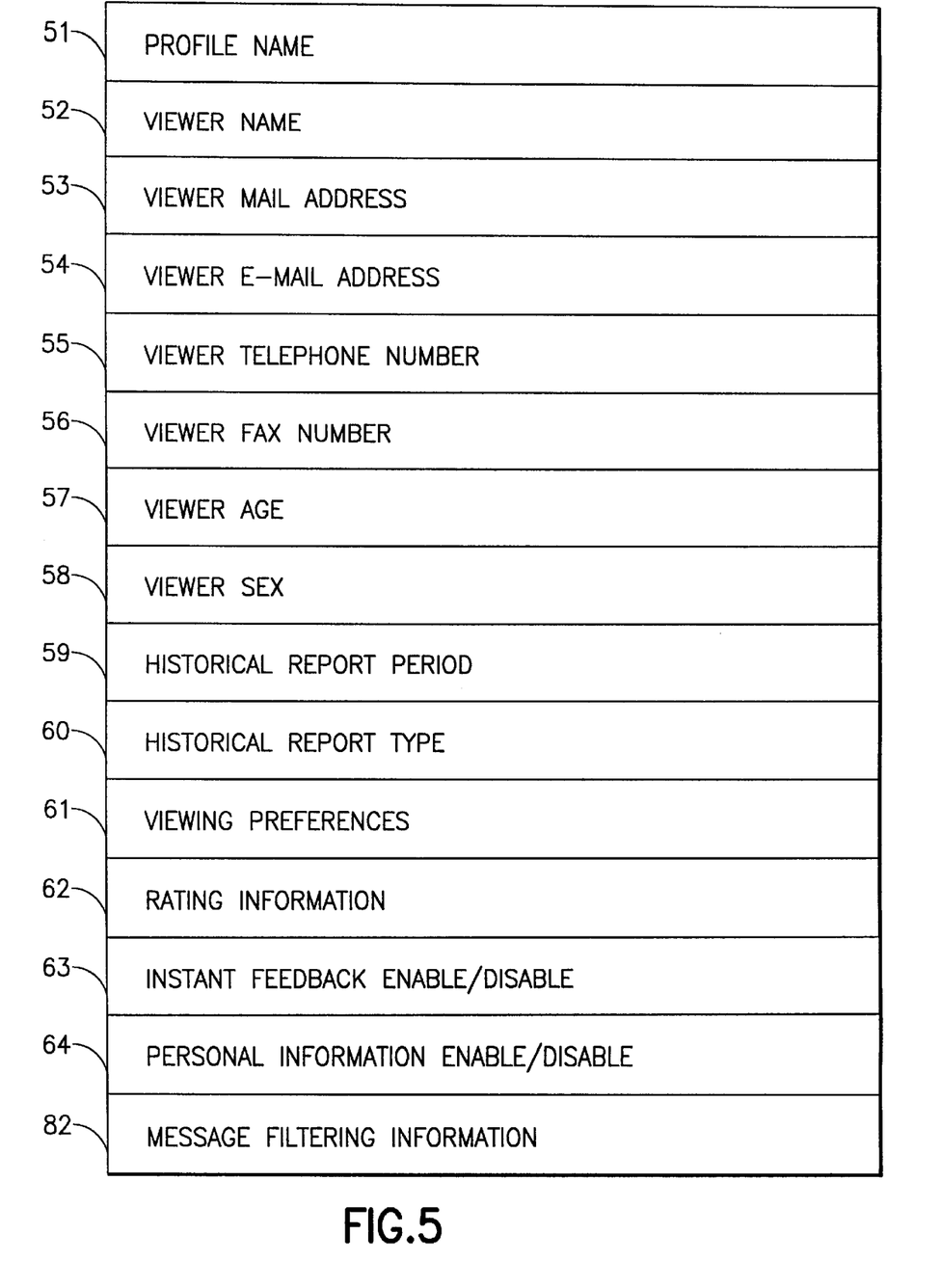
FIG. 5 shows the format for the viewer profile information. As described in detail below, a profile, containing general information concerning the viewer's preferences, is chosen at the start of each viewing session. During the session, the subscriber selection history information is added to the selection history associated with that profile.

The viewer profile (see FIG. 5) contains viewer profile information and is meant to summarize the requirements and preferences of the viewer, for use by the user's system and the head end. It can be transmitted to the head end for the latter's use, during the process of profile creation. A user can have any number of viewing profiles, if so desired. This may be useful in offering a variety of viewing session types to the user, for example, "academic" viewing, where embedded data is critical, versus "entertainment" viewing, where it is less so. These profiles are differentiated by profile name 51. Rating information 62 allows the head end and STB to know what material is appropriate for this user and can be used to prevent the transmission or display of offensive material. When a user completes the process of creating a new viewer profile, it is stored in the STB's non-volatile RAM and a copy is sent to the head end.

Iterative Video-Based Data Search and Retrieval

Figure 3:
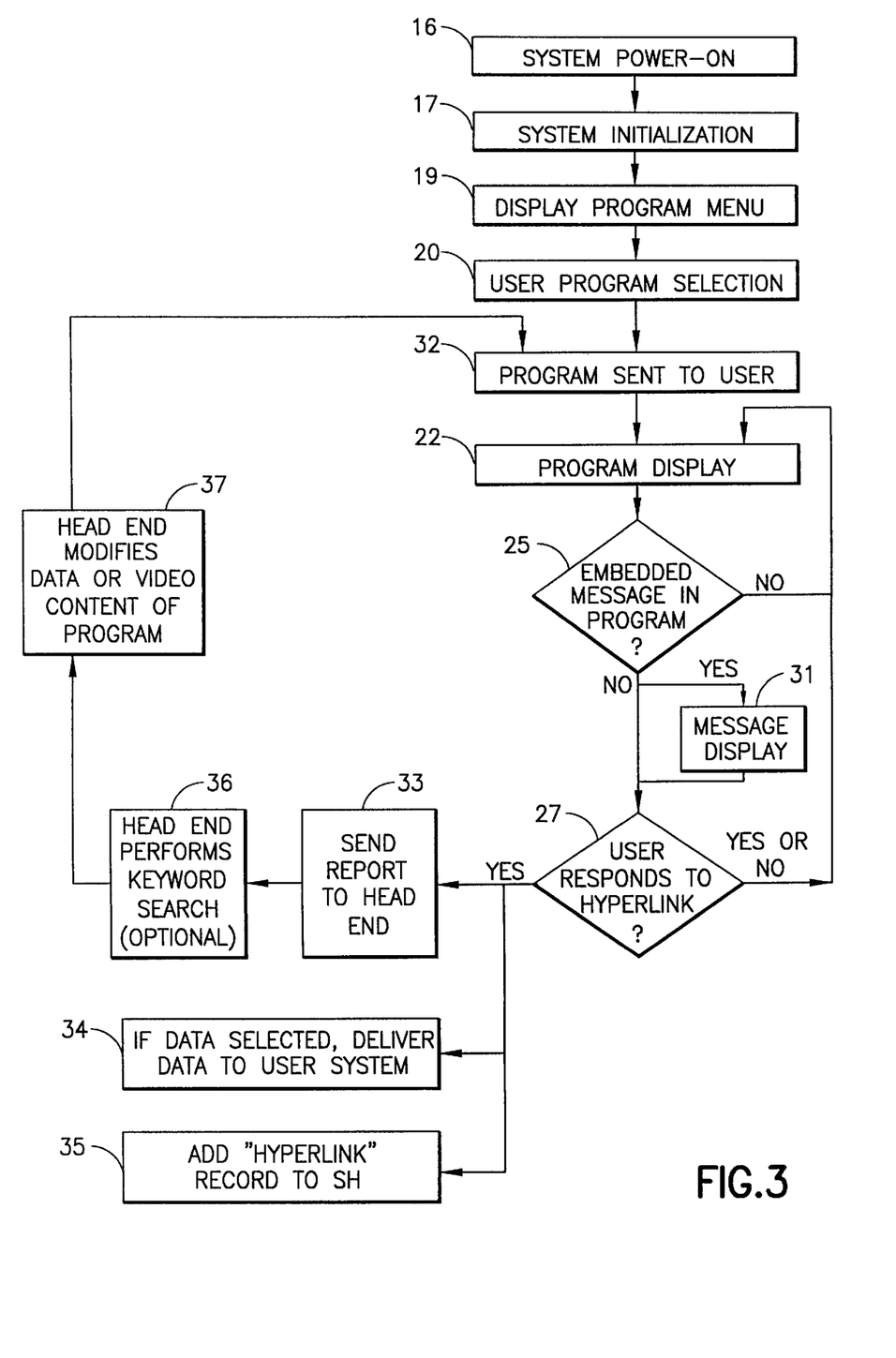
FIG. 3 is a flowchart displaying the operation of VRS for iterative user/server data search and retrieval. The main feedback loop shown in the figure demonstrates the use of VRS reports, sent from the STB to the head end, in iteratively refining the embedded data sent to the user within the multiplex which is sent to the viewer (see below for definition).

FIG. 3 shows the operation of the VRS when used for the function of iterative video-based user/server data search and retrieval.

Following system is power-on, the system initializes and offers a program menu to the user. The user selects a program for viewing from those offered. The program selected, in this case, contains embedded data—i.e. data (or other multimedia) content related to the topics displayed in the program. Messages pertaining to the embedded data may or may not be filtered out by the microcontroller, depending on the viewer's history and interests. The embedded data is offered to the viewer by display of a "hyperlink". When the user selects a hyperlink for the delivery of a unit of embedded data, a selection history record (SHR) is written to the selection history (SH) 15. With the delivery of the selected embedded data to the user 34, a report indicating the selection of the embedded data is sent to the head end (if the viewer has enabled this function.) Upon receipt of this report, the head end system optionally performs a database search 36 on the basis of keywords from the report. Optionally, the user could be prompted to supply additional keywords.

Using the search results (or the contents of the report, if a search was not performed), the head end will alter the content of the embedded data to match the current interests of the user and the "zero in" on specific topic areas in which he has shown interest. Unless the user has his own dedicated video channel (i.e. Video-on-Demand), the head end's content alteration will be on the basis of responses from groups of users. In effect, this creates a "polling" system, whereby the group of users lets its interests be known to the head end, which responds to the consensus of a given percentage of the users.

The user(s) respond(s) to the new embedded data based on his interests, causing another alteration by the head end of the embedded data, and so forth. Thus the search and retrieval of data is an iterative adaptive process engaged in by the user(s) and the head end in tandem.

Dynamic Customization of Embedded Data

As described above (see "Intra-Video Navigation"), objects in the multiplex are marked in preparation for the transmission to users of the program. In the marking process, an object, such as a video object, is associated or corresponds with related multimedia objects in the stream and/or pointers to objects which are not currently in the stream. The association information is itself sent in the stream, as control information, and is monitored by the STB.

The head end can dynamically modify both the content of the stream and the control information associating objects in the stream, in response to user interest. If a user (or group of users) demonstrates, by selection of embedded data and/or intra-video navigation, interest in a particular topic, the data embedded in the stream can be modified to reflect this interest. This modification can occur during the viewing of the program, within seconds of the indication, by the user (or group of users) of a new topic of interest. The control information must be modified as well, to establish the association of the new embedded data with the previously marked objects in the video.

In addition to the above, the head end can dynamically modify the associations alone, without modifying the data content. For example, the data embedded in the stream of a sports program may include historical, statistical, and anecdotal information related to the players (i.e. the video objects). If a majority of viewers show an interest in statistical information when selecting the embedded data associated with a player, this information could be displayed immediately on screen when a player is selected. Alternatively, a menu offering statistical, historical, or anecdotal information could be displayed when a player is selected.

FIG. 9 shows an example of the dynamic modification of stream content in response to a user selection.

Personalized Program Creation

In the multiplex sent to the user, multiple program segments (see definition above) may be sent. These segments may overlap in time, as shown in FIG. 8. The transmission of multiple program segments such as those shown in FIGS. 8a–c enables the creation, by the user or automatically by the STB, of personalized programs based on the users' interests.

Program segments may be related to different topics (such as different news items in a news broadcast) or the same topic at different depths (such as a 5-, 10-, or 15-minute news item about a given topic.) In FIG. 8a, for example, four topic areas, A–D, are shown, and are transmitted in four overlapping media streams of the video stream in the multiplex.

It should be noted that the creation of these personalized programs as depicted in FIGS. 8a–8c can be done in the broadcast mode, and does not require an upstream channel. FIG. 9 shows how the upstream channel can be used for an enhanced program creation process, one which involves interactivity.

As shown in FIG. 8, the program segments can be synchronous (FIG. 8a), semi-synchronous (FIG. 8b), or asynchronous (FIG. 8c). Synchronous program segments, for each media stream begin and end at the same points. Semi-synchronous segments have some common juncture points (such as at the 15-minute point in FIG. 8b), while asynchronous segments have none.

In the case of semi-synchronous or asynchronous program segments, the user commencing the viewing of a program segment already in progress has the option of viewing it from the point where he entered (i.e. truncating the content up to that point) or storing the content of that segment prior to viewing and viewing it from the start when the user is ready. The latter approach requires a considerable storage capacity in the STB (see the preferred embodiment), as the storage requirement will be cumulative with each "in-progress" segment which the user joins.

The user interfaces with the STB at the beginning of a program to perform the program creation. The STB receives, from the downstream channel, control information regarding the program segments available for the currently-broadcast program, and offers a menu of choices to the user. From these choices, the user selects a set of program segments, which may or may not overlap in the time of their broadcast for display. If there is display overlap, storage may be required, as described above. One set of program segments may be designated as the default set, if the viewer does not make any selection.

Alternatively, the program segment selection may be done for the user automatically, by the STB. Using the selection history summary information, the STB can select among the available program segments, provided they are associated with keywords identifying their topic areas (to enable the STB to choose among them.)

For the example of FIG. 8a, a user (or STB) may select the segment set ($B_1$, $D_2$, and $A_3$). In this case, there is no display overlap, and no additional STB storage is required.

The STB then demultiplexes the desired set of program segments in sequence to display the personalized program. Segments may also be stored for future viewing, in case the viewer selects too many segments for display in the program time. Segments may also be re-ordered, if necessary or desirable, such as in the case where a user selects segments which overlap entirely. For example, in the stream depicted in FIG. 8a, a user may select segments $D_1$, $B_1$, and $A_1$, and request that they be played in that sequence. Re-ordering requires STB storage for delayed play.

Because of the high bitrate requirements of digital video, a compression method is usually applied to video before transmission over a network. In the preferred embodiment, video (and audio) content are compressed using MPEG-2 (Motion Pictures Experts Group) compression, as specified in ISO/IEC 13818-2 for video and ISO/EC 13818-3 for audio. Typical bitrates for compressed MPEG-2 video streams range from 3 to 15 Mbps.

The MPEG-2 standard also specifies how programs (consisting of audio and video elementary streams) can be multiplexed together in a "transport stream". This is specified in the MIPEG-2 Systems Specification, ISO/IEC 13818-1. The MPEG-2 Systems Specification accommodates the inclusion in a program's transport stream of non-video and non-audio streams, by use of "private data" streams. All transport stream packets, regardless of content, are of a uniform size (188 bytes) and format. "Program-Specific Information", which is also carried in the transport stream, carries the information regarding which elementary streams have been multiplexed in the transport stream, what type of content they carry, and how they may be demultiplexed.

In the downstream direction, a shared broadcast medium is used for the preferred embodiment, such as the cable TV infrastructure. Modulation methods to be used include QAM (quadrature amplitude modulation) and VSB (vestigial sideband). Chipsets for these demodulation types are widely available and inexpensive. The bandwidth required in this direction for the implementation of VRS is at most 10 Kbits/s.

In the upstream direction, the preferred embodiment of VRS uses the PSTN (public service telephone network). In conjunction with an ADSL. (asymmetric digital subscriber line) chipset for modulation in this direction, the user's home phone line may be used simultaneously for VRS messages and for regular voice phone service. This chipset would be included in the output port module shown in FIG. 1. The required bandwidth in this direction is at most 10 Kbits/s.

The use of VRS-capable STB's in a broadcast distribution network does not interfere with the use of conventional STB's in the same network. For purposes of STB polling (see above), the head end would need to be aware of the address of the VRS-capable STB's. MPEG-2 demultiplexers, MPEG-2 audio decoders and MPEG-2 video decoders are now widely available. The preferred embodiment uses these integrated circuits (IC) in the VRS-capable STB to perform the functions indicated in the block diagram of FIG. 1. If not incorporated in the audio and video decoder, an intermediate IC is necessary at the output of the decoders to convert from digital to analog and, in the case of video, encode to the desired video analog signal format (such as NTSC, PAL, or SECAM.) S-video output from these IC's is optional. The MPEG-2 video decoder used in the preferred embodiment has "on-screen display" capabilities for superimposing text and other bitmaps on the video screen, at a variety of intensities.

The microcontroller for the STB requires a clock and an EPROM for instruction storage. In the preferred embodiment, the clock rate is 25 MHz, and the EPROM size is 256 KBytes. The microcontroller programs the MPEG-2 demultiplexer to create a queue for embedded data, in addition to those created for audio and video packets. The embedded data queue is monitored by the microprocessor by polling or interrupts. When this queue is found to be non-empty, its contents are read by the microprocessor. If they are message packets, their content is converted into bitmaps for on-screen display. This display involves the microprocessor programming the video decoder as to the location, size, and other parameters of the bitmap. The viewer may disable the display of data availability messages.

The size of the RAM needed for a VRS-capable STB in the preferred embodiment is (minimally) 4 Kbytes. To reduce cost, DRAM (dynamic RAM) is used. A small amount (1 Kbyte) of non-volatile RAM is used for data (such as viewer profiles) which must be preserved when the STB is powered off. A battery is required for this RAM and for maintaining the time-of-day timer.

To save RAM data in anticipation of power-off, to save files which are larger than the RAM size, or to accumulate a larger number of SHR's than the RAM can accommodate, the STB's data port is used to transfer data to a PC. This port can also be used to transfer large historical reports from the PC to the STB, en route to the head end.

The data port used in the preferred embodiment is an RS-232 parallel port.

In the preferred embodiment, the audio signal is encoded and decoded as two channels (with the additional option of Dolby noise reduction and surround sound) and requires multiple speakers at the STB output.

To indicate the presence of marked objects, video highlighting is used in the preferred embodiment. This highlighting is performed by the decoder's on-screen display capability at the instruction of the microcontroller, which obtains the coordinates of the video object from the control information. For audio "highlighting", in the preferred embodiment, a tone is used, preceding by a short time the marked words. Both audio and video highlighting can be disabled by the user who is not interested in their use.

Selection of marked objects, in the preferred embodiment, is performed by the use of the IR interface of the remote control. This interface moves an on-screen cursor to the objects, and clicking on a pre-assigned button of the remote control is used to select video objects and objects displayed in on-screen menus. For the selection of audio objects, an "audio-related information" icon is displayed at the edge of the screen, which, when the cursor is moved to it and the selection button clicked, provides the data associated with the marked audio object which is most recent.

Having thus described our invention, what we claim as new and desire to secure by Letters Patent is:

1. In a communications network having a head end server and a plurality of subscribers connected to said head end server, a method of customizing responses to selection objects in a video program profile, said method comprising:
   a. transmitting selected video programs from said head end server to a subscriber or a group of said plurality of subscribers in response to requests for said selected video programs from said subscriber or said group said plurality of subscribers;
   b. each of said subscriber or said group of said plurality of subscribers selecting objects in received ones of said selected video programs, each of said objects being an image in a received one of said selected video programs, each of said objects not being a part of any supplemental information added to any one of said selected video programs, and each of said objects corresponding to an embedded data file containing information on a subject which corresponds to the appearance of each of said objects;
   c. maintaining a selection database of a history of object selections history information, wherein subscriber selection history information is acquired for each of said subscriber or said group of subscribers; and
   d. dynamically adjusting correspondence of said objects to embedded data files transmitted along with received one of said selected video programs in response to said subscriber selection history information, wherein each of said subscriber or said group of said plurality of subscribers receives customized infonnation in response to selecting one of said objects in said received one of said selected video programs.

2. The method of customizing responses to selection objects in a video profile as claimed in claim 1, wherein said subscriber selection history information is transmitted, at the discretion of a viewer, instantly to said head end server with granularity of a single channel viewing or object selection, and said transmission is unobtrusive to the viewer.

3. The method of customizing responses to selection objects in a video program file as claimed in claim 1, wherein a number of said embedded data files are dynamically changed in accordance with said subscriber selection history information, and in accordance with database search activity results.

* * * * *